United States Patent [19]

Downey

[11] Patent Number: 4,764,866
[45] Date of Patent: Aug. 16, 1988

[54] DATA PROCESSING SYSTEM WITH PRE-DECODING OF OP CODES

[75] Inventor: Philip A. Downey, West Lothian, Scotland

[73] Assignee: Burr-Brown Limited, United Kingdom

[21] Appl. No.: 894,070

[22] Filed: Aug. 7, 1986

[30] Foreign Application Priority Data

Apr. 5, 1986 [GB] United Kingdom ............... 8608368

[51] Int. Cl.⁴ ............................................... G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,993,981 | 11/1976 | Cassarino, Jr. et al. | 364/200 |
| 4,042,972 | 8/1977 | Gruner et al. | 364/200 |
| 4,075,691 | 2/1978 | Davis et al. | 364/200 |
| 4,096,571 | 6/1978 | Vander Mey | 364/200 |
| 4,133,030 | 1/1979 | Huettner et al. | 364/200 |
| 4,237,534 | 12/1980 | Felix | 364/200 |
| 4,290,104 | 9/1981 | Hotley et al. | 364/200 |
| 4,363,094 | 12/1982 | Kaul et al. | 364/200 |
| 4,371,925 | 2/1983 | Carberry et al. | 364/200 |
| 4,385,382 | 5/1983 | Goss et al. | 364/200 |
| 4,462,073 | 7/1984 | Grondalski | 364/200 |
| 4,541,048 | 9/1985 | Propster et al. | 364/200 |

OTHER PUBLICATIONS

MC68020 32 Bit Microprocessor User's Manual, 2nd Ed., 1984, Motorola Inc., Englewood Cliffs, N.J., Chpts. 1, 4, 5.

M. Morris Mano, Computer System Architecture, 2nd Ed., 1982, Prentice Hall, Inc., Englewood Cliffs, N.J., pp. 406-424.

*Primary Examiner*—Raulfe B. Zache
*Assistant Examiner*—Eric Coleman
*Attorney, Agent, or Firm*—Harry M. Weiss & Assoc.

[57] ABSTRACT

A data processing system has a host processor (100) and an interface processor (160) both accessing a RAM (136) via respective RAM address generators (128, 132). RAM control logic (122) coupled to the data bus (124) and associated with the interface processor (160) provides pre-decoding of op codes on the data bus and generates control signals. The control signals are used to speed up memory access by the interface processor, to provide memory address generation for the interface processor, or to control memory access by the interface processor.

6 Claims, 3 Drawing Sheets

DATA PROCESSING SYSTEM WITH PRE-DECODING OF OP CODES

TECHNICAL FIELD

This invention relates generally to the field of data processing, and, more particularly, to a circuit for pre-decoding of opcodes for the purpose of controlling the operation of the processor.

BACKGROUND OF THE INVENTION

It is well known in the data processing arts to provide logic in the processor unit for decoding that portion of an instruction referred to as the operation code, or "op code". The op code typically specifies a particular function to be performed by the processor, such as transferring data between registers, accessing memory, adding the contents of two registers, etc.

In the operation of the ordinary processor unit, instructions are accessed sequentially from memory, and the op code decoding logic decodes the op code, so that appropriate logic circuitry in the processor can generate the proper control signals to control the specified processor operation.

There exists a significant need in this technology for ways in which the throughput of the processing unit can be increased.

SUMMARY OF THE INVENTION

It is therefore an object of the present invention to provide improved instruction decoding logic in a data processing system.

It is a further object of the present invention to provide an auxiliary op code decoding circuit in a data processor for pre-decoding of op codes.

It is also an object of the present invention to speed up or control memory access by a processor, and to provide address generation by a processor, in response to predetermined op codes.

These and other objects are accomplished in accordance with a preferred embodiment of the invention by providing data processing apparatus including a memory for storing information including instructions, each instruction comprising an op code; a first processor, the first processor including first op code decoding logic means; a data bus coupling the first processor to the memory; and second op code decoding logic means coupled to the data bus and responsive to the presence of an op code on the data bus for decoding the op code and generating at least one control signal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1A:
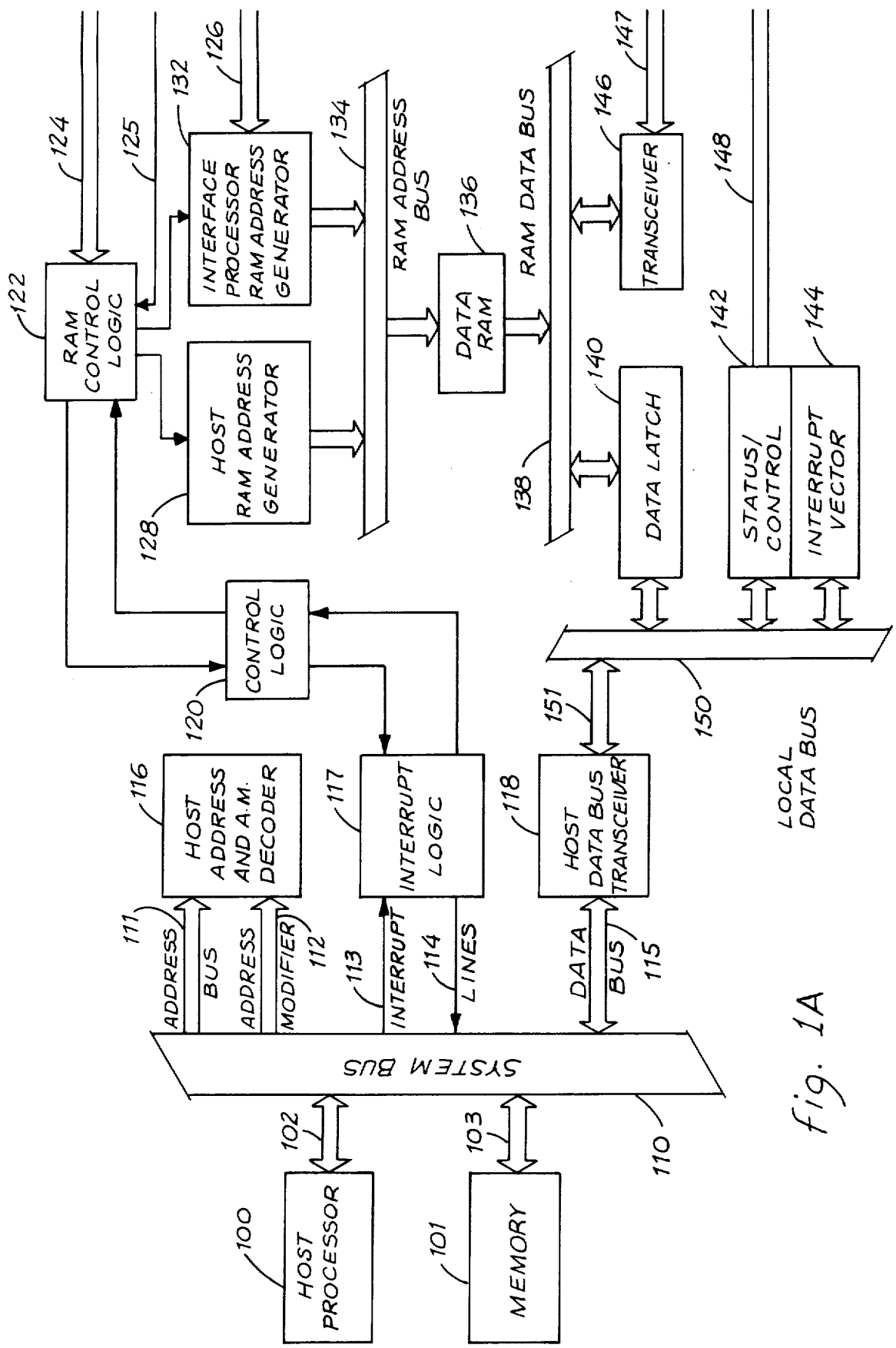
FIGS. 1A and 1B together illustrate a detailed block diagram of a data processing system in the form of a data acquisition system incorporating the opcode pre-decoding and comparison circuit of the present invention.
Figure 1B:
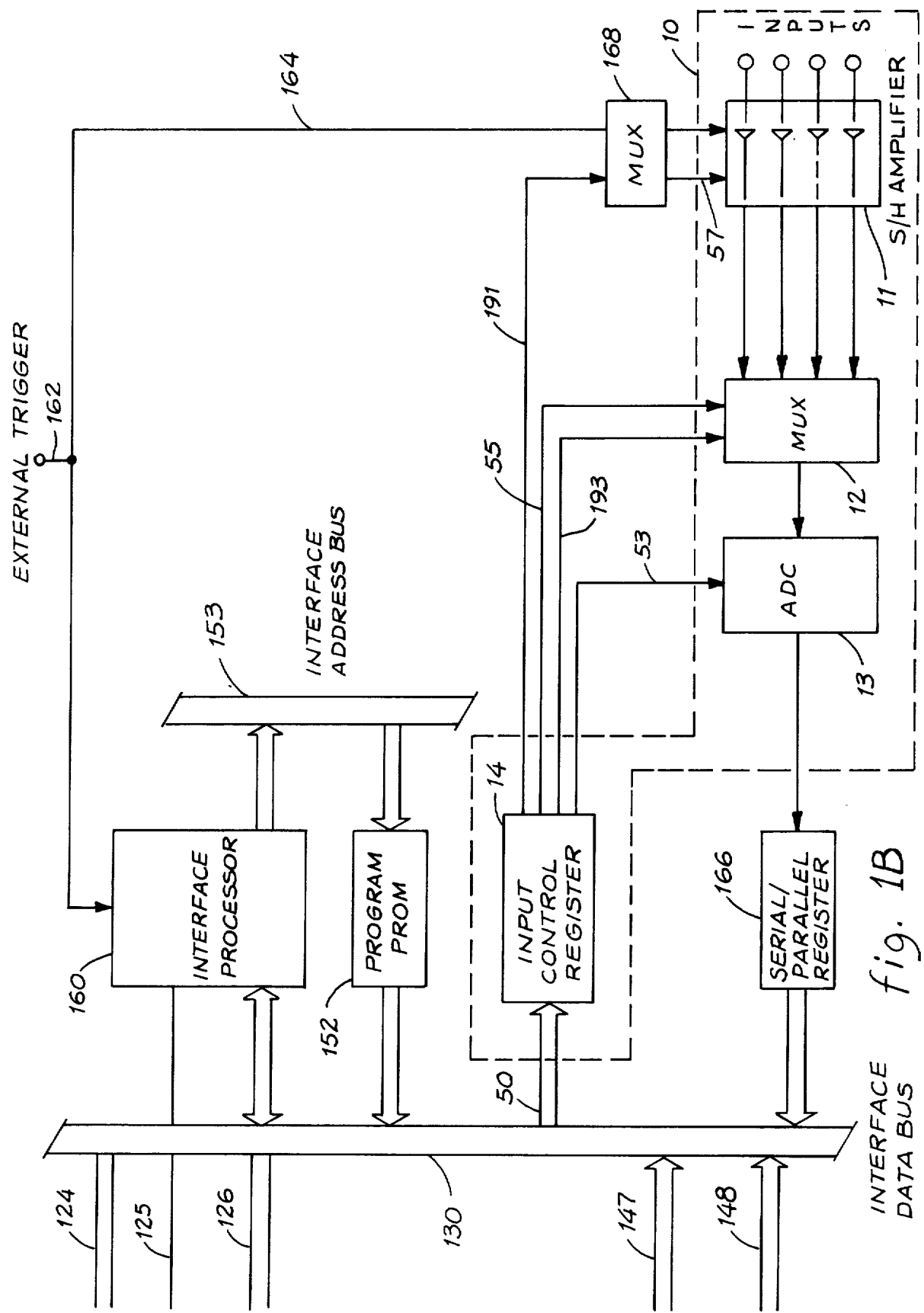

FIGS. 1A and 1B show a detailed block diagram of a data acquisition system incorporating the opcode pre-decoding and comparison circuit of the present invention.

The data acquisition system comprises sampling/digitizing portion 10. Portion 10 includes sample/hold amplifiers 11, multiplexer 12, A/D converter 13, and input control register 14.

The interface unit also comprises an interface processor 160 coupled between interface data bus 130 and interface address bus 153. A program PROM 152 stores programs and/or data for controlling the operation of interface processor 160.

In a preferred embodiment, interface processor 160 is a TMS320 digital signal processor commercially available from Texas Instruments, Inc. Interface processor 160 provides the intelligence for the interface unit, and it may be programmed to offer flexible operating modes and to carry out various digital signal processing functions. It operates at sufficient speed to permit it to control directly the data acquisition operations of the sampling/digitizing portion 10, as well as perform other control operations of the interface unit.

Referring to FIG. 1A, the interface unit also comprises a data RAM 136 for temporarily storing data and instructions. Data RAM 136 is a dual-port RAM which can be accessed by either the interface processor 160 or the system bus 110 associated with host processor 100. Data RAM 136 is coupled to the interface data bus 130 via transceiver 146 and the RAM data bus 138. Data RAM 136 is coupled to host system bus 110 via data latch 140, local data bus 150, host data bus transceiver 118, and data bus 115.

RAM control logic 122 controls arbitration of data RAM 136 access between the interface processor 160 and the system bus 110. The interface processor 160 always has priority access.

Host RAM address generator 128 and interface processor RAM address generator are responsive to the RAM control logic 122 to generate appropriate RAM addresses on the RAM address bus 134.

The host address and address modification decoder 116, interrupt logic 117, and control logic 120 provide various addressing and control functions for the host system with respect to the interface unit.

The host processor 100 is coupled to the system bus 110 via bus segment 102. Host processor 100 may be any appropriate processor. The memory 101 supporting the host system is coupled to the system bus via bus segment 103. In a preferred embodiment, system bus 110 is a bus meeting the VME bus standard.

Field programmable logic arrays (FPLA's), and in particular programmable array logic (PAL) devices commercially available from Monolithic Memories, Inc., are used in many of the control logic circuits of the present invention, such as the host address and address modification decoder 116, the interrupt logic 117, control logic 120, host RAM address generator 128, interface processor RAM address generator 132, and RAM control logic 122.

In operation, the interface unit shown in FIGS. 1A and 1B captures analog data at sampling rates determined by the interface processor 160 or by an external trigger source 162. The interface processor 160 can process the data in real time and store it in data RAM 136 for access by the host processor 100 via the system bus 110. Thus analog signals can be continuously sampled at fixed rates independent of asynchronous events in the host system such as dynamic RAM refreshing and the servicing of other tasks.

Figure 2:
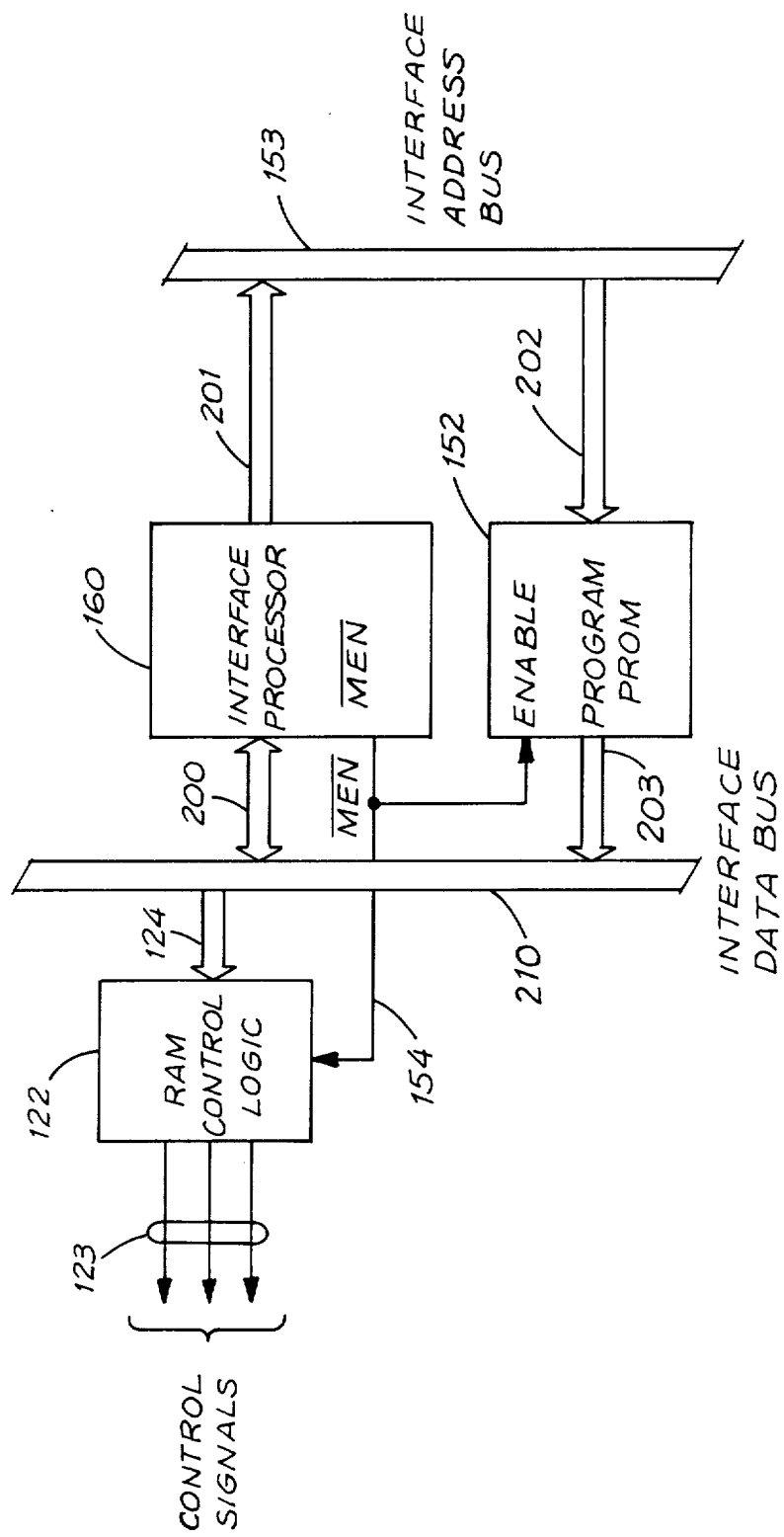
FIG. 2 is a more detailed block diagram of a preferred embodiment of the opcode pre-decoding and comparison circuit of the present invention.

FIG. 2 is a more detailed block diagram of a preferred embodiment showing the opcode pre-decoding and comparison circuit which, for the embodiment shown in FIG. 2, takes the form of RAM control logic 122. The RAM control logic 122 is responsive to bus portion 124 of the interface data bus 210. The interface data bus 124 also serves as the conduit for program instructions originating in the PROM 152 to be transmitted to the interface processor 160.

When the op code portion of an instruction is placed on data bus 210 during the op code fetch portion of an instruction cycle (i.e., when the memory enable (MEM) signal is active), RAM control logic 122 reads it.

In a preferred embodiment of the invention, RAM control logic 122 comprises one or more programmed logic arrays (PLA's), the specific choice of which is left to routine electronics circuit design. Responsive to the op code signals on bus portion 124, the PLA's in RAM control logic 122 generate appropriate control signals as required to control different portions of the system illustrated in FIGS. 1A and 1B.

While the concepts of the present invention may be applied for generating and/or combining control signals for any desired purpose, in response to the presence of an op code signal on the data bus, in a preferred embodiemnt the opcode pre-decoding and comparison circuit is utilized for at least three purposes: (1) dual port RAM control, arbitrating between the demands of the host processor 100 and the interface processor 160, (2) early address generation for the interface processor 160, and (3) disabling access of the interface processor 160 to the dual-port RAM 136 for certain instructions, such as certain register-to-register transfers.

Regarding the dual-port RAM control function, as mentioned above, RAM 136 contains dual ports which are accessible by both the system bus 110 and the interface processor 160. The interface processor 160 must have priority access, because it accesses synchronously and does not support "wait state" mode during memory access. However the system bus 110 is asynchronous, so that "wait states" may be inserted in its memory access cycle.

Referring to FIG. 1A, the host RAM address generator 128 may be enabled onto the RAM address bus 134 until such time as the interface processor 160 requires access. When the interface processor 160 rquires access, a finite amount of time is required for the host RAM address generator 128 to be disabled from bus 134, and for the interface processor RAM address generator 132 to be enabled, before RAM access may occur.

In a preferred embodiment of the interface, the interface processor 160 is a very high speed device, so that very little time is available using its normal READ/WRITE control signals, unless prohibitively expensive technology is used.

However, by early decoding the READ/WRITE control signals of the interface processor 160 the time and throughput requirements are achieved.

The interface processor 160 "pre-fetches" the next op code from the PROM 152 while the current instruction is executing. Thus the op code appears on the interface data bus 138 during the cycle before it is executed. The op code is then decoded, as mentioned above, using suitable circuitry employing comparators and random logic, such as PLA's. Since the op code is decoded before the execution cycle, the net result is that the dual-port RAM memory access control decisions are made before the READ/WRITE strobes are generated by the interface processor 160.

Thus if the decoded op code calls for an access by the interface processor 160 to the dual-port RAM 136, the host RAM address generator 128 can be disabled from the RAM address bus 134, and the interface processor address generator 132 can be enabled before the interface processor memory access control signals appear.

Regarding the subject of early address generation, by performing an early op code comparison during the instruction pre-fetch period, the interface processor RAM address generator 132 can perform its functions prior to the generation of a READ/WRITE signal by the interface processor 160.

As mentioned earlier, the herein-disclosed circuit has the ability to disable memory access by the interface processor 160 during certain op codes, such as, for example, during the execution of an instruction to transfer data between a data memory portion and a program memory portion. To prevent the op code early comparison circuit from incorrectly interpreting data on bus 210 as an op code, as soon as the RAM control logic 122 detects an op code relating to this type of data transfer instruction, it disables the dual-port RAM 136 by generating one or more appropriate control signals.

The various control signals are generated by appropriate decoding circuits in the RAM control logic 122 which can be readily constructed by one of ordinary skill in the art.

It will be apparent to those skilled in the art that the disclosed data processor with op code early comparison may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. Data processing apparatus including a memory for storing information including instructions, said instructions including an op code which is pre-decoded, said apparatus comprising:

a first processor, said first processing including first op code decoding logic means and means for generating at least one memory access signal in response to said op code;

a data bus coupling said first processor to said memory;

a second processor coupled to said data bus and requiring access to said memory;

a second op code decoding logic means coupled to said data bus and responsive to the presence of said op code on said data bus for pre-decoding of said op code and generating at least one control signal, said second op code decoding logic means being provided as an auxiliary op code decoding circuit to said first op code decoding logic means, said second op code decoding logic means decoding said op code and generating said at least one control signal prior to the generation of said at least one memory access signal;

a memory arbitration logic responsive to said at least one control signal for coupling said first processor to said memory in response to informational content relating to said first processor in said at least one control signal, said memory arbitration logic also being responsive to said at least one control signal for coupling said second processor to said memory in response to informational content relating to said second processor in said at least one control signal;

a first memory address generating means for generating memory addresses for said first processor upon being enabled by said memory arbitration logic depending upon the informational content of said at least one control signal, said first memory address generating means being enabled prior to the generation of said at least one memory access signal; and a second memory address generating means for generating memory addresses for said second processor upon being enabled by said memory arbitration logic depending upon the informational content of said control signal, said second memory address generating means being disabled from generating memory addresses in response to said at least one control signal prior to the generation of said at least one memory access signal.

2. Data processing apparatus as recited in claim 1, wherein said first processor fetches an instruction from said memory while said first op code decoding logic means is decoding a previously fetched instruction.

3. Data processing apparatus as recited in claim 1, wherein:
said first memory address generating means initiates said memory access signal in response to said at least one control signal prior to a decoding of said op code by said first op code decoding logic means.

4. Data processing apparatus as recited in claim 1, wherein: said first processor is prevented from accessing said memory as soon as said op code is present on said data bus.

5. Data processing apparatus including a memory for storing information including instructions, said instructions including an op code which is pre-decoded, said apparatus comprising:
a first processor, said first processor including first op code decoding logic means and means for generating at least one memory access signal in response to said op code;

a data bus coupling said first processor to said memory;

a second processor coupled to said data bus and requiring access to said memory;

a second op code decoding logic means coupled to said data bus and responsive to the presence of said op code on said data bus for pre-decoding of said op code and generating at least one control signal, said second op code decoding logic means being provided as an auxiliary op code decoding circuit to said first op code decoding logic means;

a memory arbitration logic responsive to said at least one control signal for coupling said first processor to said memory in response to informational content relating to said first processor in said at least one control signal, said memory arbitration logic also being responsive to said at least one control signal for coupling said second processor to said memory in response to informational content relating to said second processor in said at least one control signal;

a first memory address generating means for generating memory addresses for said first processor upon being enabled by said memory arbitration logic depending upon the informational content of said at least one control signal, said first memory address generating means being enabled prior to the generation of said at least one memory access signal, said first memory address generating means also initiating said at least one memory access signal prior to said first op code decoding logic means decoding said op code; and a second memory address generating means for generating memory addresses for said second processor upon being enabled by said memory arbitration logic depending upon the informational content of said control signal, said second memory address generating means being disabled from generating memory addresses in response to said at least one control signal prior to the generation of said least one memory access signal.

6. Data processing apparatus as recited in claim 1, wherein:
said second op code decoding logic means decodes said op code and generates said at least one control signal such that said first processor is prevented from accessing said memory as soon as said op code is present on said data bus.

* * * * *